(12) United States Patent
Putzolu et al.

(10) Patent No.: US 8,280,826 B2
(45) Date of Patent: *Oct. 2, 2012

(54) COMBINING SPECULATIVE PHYSICS MODELING WITH GOAL-BASED ARTIFICIAL INTELLIGENCE

(75) Inventors: David Putzolu, Hillsboro, OR (US); Aaron Kunze, Portland, OR (US); Teresa Morrison, Fort Collins, CO (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/269,664

(22) Filed: Oct. 10, 2011

(65) Prior Publication Data

US 2012/0030148 A1 Feb. 2, 2012

Related U.S. Application Data

(63) Continuation of application No. 12/079,372, filed on Mar. 26, 2008, now Pat. No. 8,069,124.

(51) Int. Cl.
*G06E 1/00* (2006.01)
(52) U.S. Cl. .............................. 706/10; 712/3
(58) Field of Classification Search .............. 706/10; 702/3; 712/3
See application file for complete search history.

(56) References Cited

U.S. PATENT DOCUMENTS

| 7,739,479 B2 | 6/2010 | Bordes et al. |
| 7,895,411 B2 | 2/2011 | Maher et al. |
| 2004/0263693 A1 | 12/2004 | Herbrich et al. |
| 2004/0266526 A1 | 12/2004 | Herbrich et al. |
| 2007/0085851 A1 | 4/2007 | Muller et al. |
| 2008/0259081 A1 | 10/2008 | Bunnell |
| 2010/0235608 A1 | 9/2010 | Armoni et al. |

FOREIGN PATENT DOCUMENTS

| EP | 1 862 973 A1 | 5/2007 |
| JP | 20011224849 | 8/2001 |
| WO | WO 2005/064474 | 7/2005 |
| WO | WO 2005/095894 | 10/2005 |

OTHER PUBLICATIONS

European Patent Office, Extended European Search Report mailed Jun. 1, 2011 in European application No. 09724996.5-2218/2254673 PCT/US2009037820.

Jeff Orkin, "Three States and a Plan: The A.I. of F.E.A.R.," 2006, pp. 1-18.

John Buchanan, et al., "Machine Learning for Semi-Automated Gameplay Analysis," Mar. 11, 2005, pp. 1-40.

(Continued)

*Primary Examiner* — Omar Fernandez Rivas
*Assistant Examiner* — Mai T Tran
(74) *Attorney, Agent, or Firm* — Trop, Pruner & Hu, P.C.

(57) ABSTRACT

In one embodiment, the present invention includes a method for identifying a deformable object of a scene of a computer game that is visible by an artificial intelligence (AI) character of the game, requesting a speculative physics simulation associated with the deformable object to determine a result of an action to the deformable object by the AI character, and selecting an action to be performed by the AI character, where the selection is based at least in part on the speculative physics simulation. Other embodiments are described and claimed.

20 Claims, 4 Drawing Sheets

OTHER PUBLICATIONS

Todd W. Neller, "Action-Based Discretization for AI Search," Dec. 11, 2002, pp. 1-12.

Scott Seongwoo Lee, et al., "A Hierarchical Multipath Approach to QoS Routing: Performance and Cost Evaluation," May 11-15, 2003, IEEE International Conference on Communications, pp. 625-630.

Karen Pivazyan, "NPC Decision Making: Dealing with Randomness," Mar. 3, 2004, pp. 325-335.

PCT/US2009/037820 International Search Report with Written Opinion of the International Searching Authority, mailed Oct. 1, 2009.

Wikipedia.org, Redirected from F.E.A.R., "F.E.A.R. First Encounter Assault Recon," Mar. 22, 2008, pp. 1-9. (http://en.wikipedia.org/wiki/F.E.A.R).

Jeff Orkin, Monolith Productions, "Applying Goal-Oriented Action Planning to Games," AI Game Programming Wisdom 2, 2002, pp. 217-227, http://www.aiwisdom.com/.

Johan Gastrin, "Physically Based Character Simulation—Rag Doll Behaviour in Computer Garnes," Royal Institute of Technology, 2004, 50 pages.

Anderson Maciel, et al., "Efficient Collision Detection within Deforming Spherical Sliding Contact," IEEE Transactions on Visualization and Computer Graphics, vol. 13, No. 3, May/Jun. 2007, pp. 518-529.

COMBINING SPECULATIVE PHYSICS MODELING WITH GOAL-BASED ARTIFICIAL INTELLIGENCE

This application is a continuation of U.S. patent application Ser. No. 12/079,372, filed Mar. 26, 2008 now U.S. Pat. No. 8,069,124, the content of which is hereby incorporated by reference.

BACKGROUND

In computer gaming, artificial intelligence (AI) can be included to govern the actions of the computer-controlled entities. Examples of AI in video games include planning, in which AI entities use finite-state machines or goal-based planning to achieve in-game goals in a way that provides the illusion of intelligence; path finding, in which AI-controlled entities use path finding algorithms to navigate the environment to reach a desired point; and steering, in which AI-controlled entities often adjust their motion based on the motion of others. Application of AI techniques allows a computer game to include non-human entities that present the illusion of intelligence and interesting challenges to a player and can be a determining aspect in the success of a video game.

Physics simulation (hereafter termed "physics") is also used in computer games. Physics in games has included such activities as detecting when objects collide and controlling the response to a collision (bounce off, merge, shatter, etc.), fluid flow simulation (e.g., for showing an environment with rivers/water, or weapons that use fluids), cloth simulation (for enhancing realism of persons and creatures wearing clothing, armor, etc.), weapons physics (trajectory simulation, explosion simulation), and a variety of other topics. More recent applications of physics in video games have started to include the concept of deformable worlds, where an object can be manipulated under the auspices of physics. In deformable worlds, some or all objects are described by their physical properties, and player interactions with the object allow changes to and manipulation of the game environment. Examples of things enabled by deformable world physics include shooting a hole through a wall rather than going through a doorway or throwing a chair found in the environment rather than firing a weapon.

However, both physics and AI can be computationally intensive workloads in video games. Physics in current games can consume $10\text{-}100 \times 10^9$ floating point operations per second (GFLOPS), with future games expected to consume even more computing resources for supporting rich environmental physics features such as volumetric fluids. Furthermore, software that implements physics and AI is often complex, both in terms of code complexity (branching, irregular/non-streaming memory accesses) and data complexity (use of sophisticated data structures). Generally, physics subsystems and AI subsystems do not interact with each other.

DETAILED DESCRIPTION

Figure 1A:
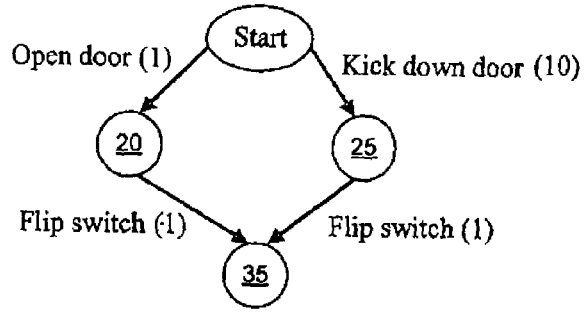
FIG. 1A is an example graph of pre-programmed potential actions in accordance with one embodiment of the present invention.

Embodiments may be used to combine AI and physics in computer-based gaming such as video games. More specifically, these different techniques can be combined by applying the concept of goal-oriented AI, in which the AI has some goal it wishes to achieve (e.g., kill a player), with speculative execution of deformable world physics (e.g., evaluating whether shooting a wall would cause a building collapse on the player). In the case of game physics and AI, a goal-based AI system thus adds physics-based deformable world deformations to its generic (as opposed to situational, pre-programmed) repertoire of possible actions. Thus, instead of a designer being forced to anticipate every option given to an AI entity by the deformability of its physical environment, the AI entity can dynamically discover its options by speculatively interacting with deformable objects. As used herein, the term "AI entity" or "AI character" refers to a representation of an actor or other agent present in a game environment that is controlled by an AI system.

As one example of AI-based discovery, the AI system could decide whether shooting at a wall might cause the player to die from the collapse, or whether pushing a bench would create a new path to reach the player, or whether detonating a bomb might cause a barrier that the player cannot traverse. This in turn would both take better advantage of the physics capabilities of deformable worlds as well as make the AI appear more creative, an aspect to providing the appearance of AI character intelligence to the player.

In contrast, in most video games today, AI and physics are used in a relatively limited fashion. AI typically is either state based or has a very limited goal-based behavior. Further, the options available to an AI character have to be described to it by a designer. This is a labor-intensive process, and a process that limits the AI to interacting with the statically created environments developed by designers. Thus, although current game AI provides the possibility of world deformation in some cases, such possibilities are manually pre-programmed by a game designer. For example, an AI character will only know if it can break through a window to enter a room if the designer adds that option explicitly in the AI algorithm. Such options usually only include a specific list of objects or actions that may be attempted. Further, current computer games use physics in a reactive form, where a player performs an action and the physics simulation models the results. However, such games do not use the combination of goal-based AI and speculative physics execution. Using an embodiment of the present invention to combine these two technologies, games can be made much more challenging and interesting to players, reduce the amount of work necessary by a game designer, and increase the ability of the AI to take advantage of physical environments in ways not anticipated by the designer.

While many different implementations are possible, one embodiment is described as an example. The example embodiment uses goal-oriented planning, in which a designer, during development of the game, creates a graph of potential action that indicates the possible actions an AI character can take and what the results might be from those actions. This is used to achieve a goal of the AI character.

An example graph of pre-programmed potential actions is shown in FIG. 1A, in which the goal is to flip a switch on the other side of a wall with a door. In FIG. 1A, the nodes are states in which the AI character can be and the edges are the actions it can take. The edges are also labeled with a cost value, giving the AI character preferences for particular courses of action. Thus as shown in FIG. 1A, potential action graph 10 includes a plurality of nodes 20, and 35 which each can define a state in which the AI character is. Specifically, state 20 may be associated with a positioning and state of the AI character after opening the door, node 25 is associated with the state and positioning of the AI character after kicking down the door, while state 35 may be reached after the AI character flips on the switch. In one embodiment, the AI subsystem operates to find the shortest-cost path through the graph to the goal and implement the plan. For example, if the door is locked, the AI would realize this, and re-plan. In the embodiment of FIG. 1A, the numbers in parenthesis may represent the cost of each action.

Using an embodiment of the present invention, this preprogrammed graph can be dynamically augmented with options provided by queries from the AI system to the physics system. For example, following the scenario above, some sections of walls can be modeled as stacks of bricks that can be manipulated with explosives. Without input from the designer, the AI system may dynamically perform a raycast to identify all deformable objects visible from the character. If such objects are found, a speculative physics simulation may be run to see if the result of shooting the objects with, for example, a rocket launcher, would allow the AI character to reach its goal. If such options were available, the graph from FIG. 1A would be augmented to look like the graph in FIG. 1B.

Figure 1B:
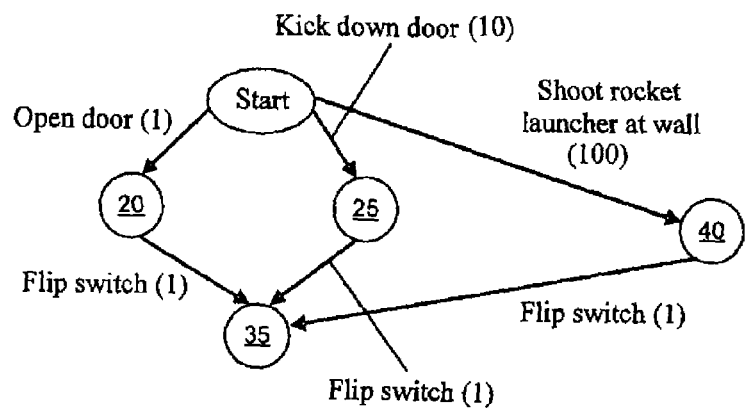
FIG. 1B is an example graph in accordance with one embodiment of the present invention.

More specifically, FIG. 1B shows a potential action graph in accordance with an embodiment of the present invention. In graph 10, an additional state 40 is present. This additional state 40 may be dynamically added to the graph during run time of the game. That is, the AI subsystem may, upon viewing an environment in which it is, determine the presence of a deformable object (e.g., the wall) and generate a request to the physics subsystem to perform a speculative physics simulation to determine whether performing an action (e.g., shooting a rocket launcher at the wall) will result in a desired result, namely knocking down the wall or portion of it such that the AI character can reach its final goal. Accordingly, graph 10' of FIG. 1B is dynamically generated during run time, by beginning with preprogrammed options identical to those of graph 10 of FIG. 1A and updating the graph based on the results of one or more speculative physics simulations requested by the AI subsystem. This augmented graph thus allows the AI character to interact with its environment in different ways, without needing a designer to explicitly describe all of its possible actions. Note that in the embodiment of FIG. 1B, the cost of shooting a rocket at the wall may be higher than the other potential actions. In some implementations, such cost determinations for the speculative actions may be determined by the designer. For example, all rocket launcher use might be given a specified cost that is a higher cost than a melee punch if a designer wants an AI character to prefer the more subtle approach. In other implementations, the cost may be generated by the physics subsystem. For example, the work exerted to push blocks of a particular weight might be used to give the AI character a preference to less physical exertion.

Figure 2:
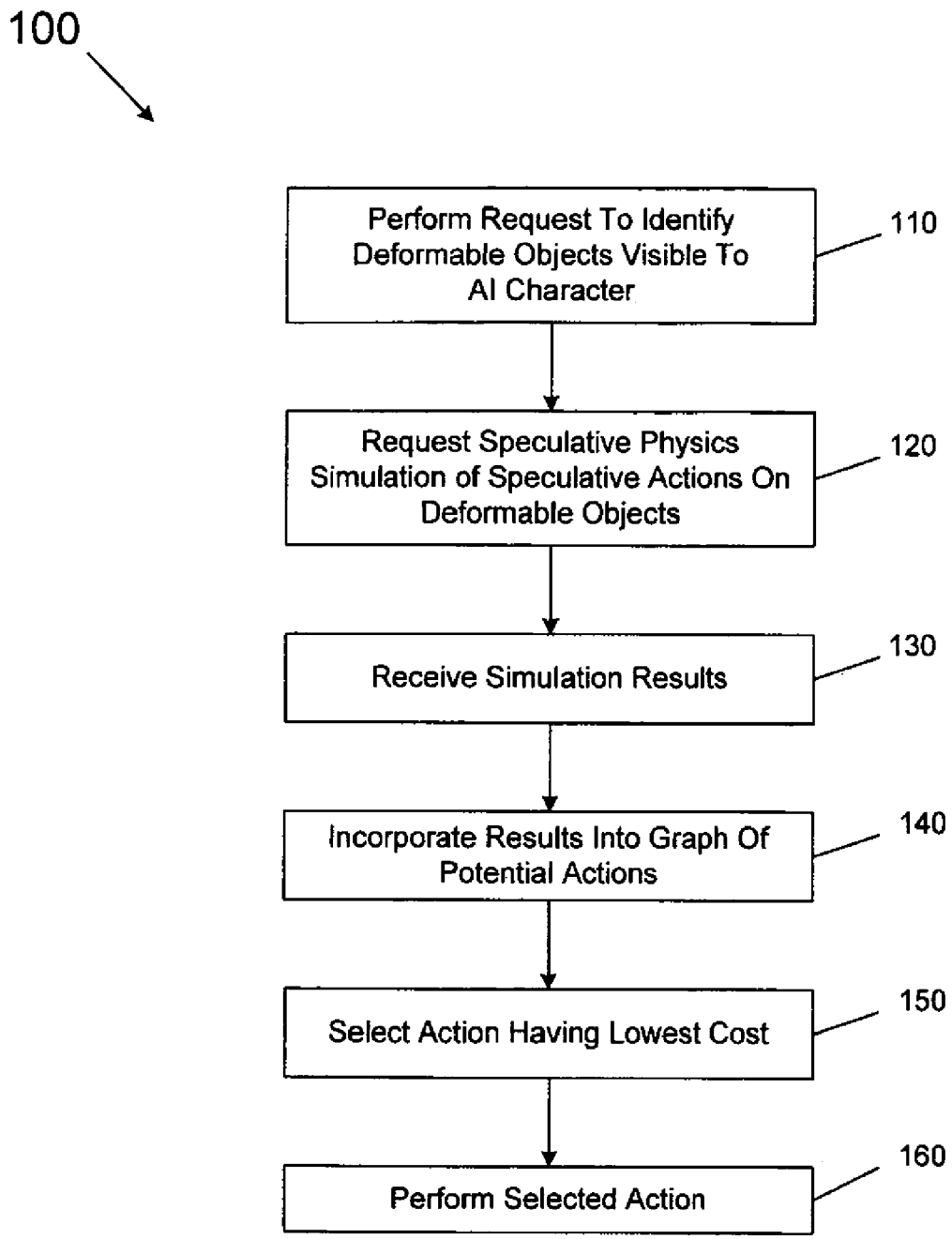
FIG. 2 is a flow diagram of a method in accordance with one embodiment of the present invention.

Referring now to FIG. 2, shown is a flow diagram of a method in accordance with one embodiment of the present invention. As shown in FIG. 2, method 100 may be used by an AI subsystem during run time to request and obtain results of one or more speculative physics simulations and use such results in determining an action to be taken. Note that while the flow diagram of FIG. 2 is with regard to run time during game operation, embodiments may also be used during design portions of a game development. Thus, as described further below, an AI subsystem may operate in a similar manner to that shown in FIG. 2 during prototype execution of the game to determine various potential actions that may be taken on the deformable objects, such that based on the results of speculative physics simulations, a game designer may choose to incorporate one or more of the potential actions into the preprogrammed selection of actions to be enabled.

Referring now to FIG. 2, method 100 may begin by performing a request to identify the deformable objects visible to an AI character (block 110). In various embodiments, during game operation the AI subsystem, when an AI character enters an environment, may determine the presence of one or more deformable objects that is visible to the AI character. For at least one and possibly more or all of these deformable objects, the AI subsystem may generate a request for a speculative physics simulation of speculative actions to be performed on one or more of these deformable objects (block 120). Accordingly, the AI subsystem sends these requests to the physics subsystem which may perform the speculative physics simulations, as described further below.

At block 130, the simulation results may be received from the physics subsystem. Based on those results, which may indicate whether a given speculative action is successful in causing a desired result, such as knocking down a wall, erecting a barrier, or causing some other desired action, the results may be incorporated into a graph of potential actions (block 140). For example, with reference back to FIG. 1B, based on a result of the speculative physics simulation, additional node 40 may be added by the AI subsystem to thus generate graph 10'. Based on this graph, an action of the potential actions (e.g., as set forth in the graph) may be selected (block 150). More specifically in one embodiment, the AI subsystem may select the action having a lowest cost to perform. Finally, at block 160 the selected action may be performed. While shown with this particular implementation in the embodiment of FIG. 2, the scope of the present invention is not limited in this regard, and the AI subsystem may request and use results of speculative physics simulations differently than that described above.

Performing speculative physics simulation can be computatively expensive. Thus in some embodiments, variances of a full speculative physics simulation can be performed in order to reduce the complexity, so that it works in the broadest range of game scenarios and hardware environments. These variants include: performing less-accurate physics simulations for speculative physics than for the physics that actually cause objects to move in the game; limiting the amount of processor time used to perform speculative physics simulations (for example, such simulations may be limited to a predetermined level of processor bandwidth, e.g., under 50%); and prioritizing physics simulations by how far an object is from an AI character's line-of-sight. Note that conducting multiple concurrent simulations will parallelize well, as separate speculative physics simulations can proceed completely independently.

Figure 3:
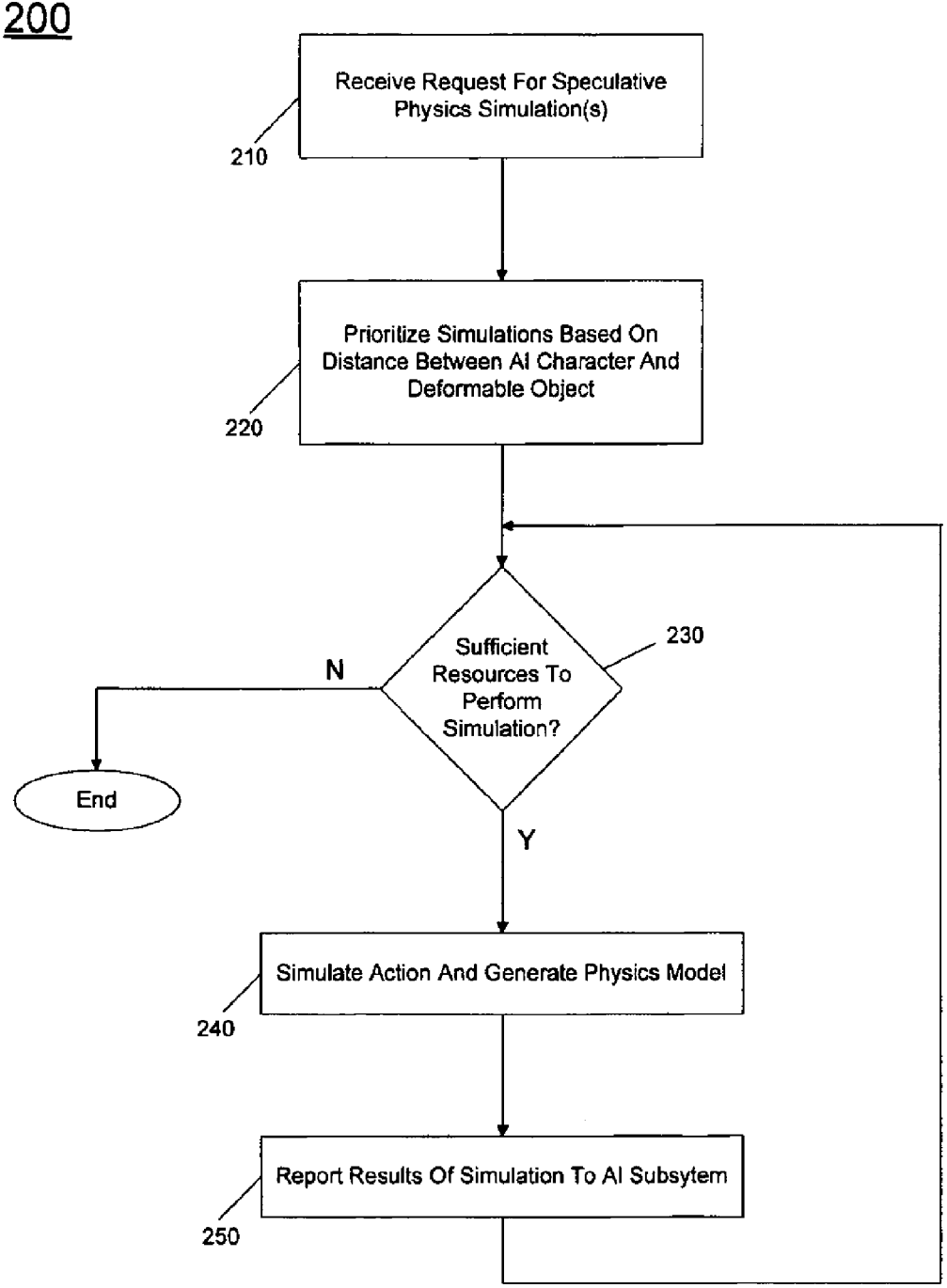
FIG. 3 is a flow diagram of a method of performing one or more speculative physics simulations in accordance with an embodiment of the present invention.

As discussed above, various optimizations may be done with regard to speculative physics simulations to reduce computation complexity and so forth. Referring now to FIG. 3, shown is a flow diagram of a method of performing one or more speculative physics simulations in accordance with an embodiment of the present invention. As shown in FIG. 3, method 200 may begin by receiving a request for one or more speculative physics simulations (block 210). Next, the physics subsystem may prioritize these simulations based on a distance between the AI character and the deformable object (block 220). For example, assume that numerous requests have been received, with at least one request associated with each of multiple deformable objects within view of an AI character. To enable prioritization, the physics subsystem may select the closest object for performing the physics simulation. At the least, the physics subsystem may order the simulations such that the closest objects are first analyzed.

Next, referring still to FIG. 3, for each simulation it may be determined whether there are sufficient resources to perform the simulation (diamond 230). For example, in one implementation simulations may be parallelized and provided individually to each of multiple cores or other processing units of a given processor. If no resources are available for a given simulation, the method may conclude as to that simulation. If instead resources are available, control passes to block 240 where the action may be simulated and a physics model may be generated (block 240). For example, a physics model may be implemented to perform an integration stage and a collision detection stage. In the integration stage, the deformable object and/or other bodies may be moved, and at one or more points during this integration stage, a collision detection may be performed to determine whether two such bodies have collided. Based on the amount of resources available, different granularities of these integration and collision detection stages may be performed. When a simulation is complete, the results of that simulation, which may correspond to an identification of a deformable object and the speculative results (e.g., whether a wall has been crumbled or so forth) may be communicated back to the AI subsystem (block 250). Then, if there are additional simulations to be performed, control may pass back to diamond 230 discussed above. While shown with this particular implementation in the embodiment of FIG. 3, the scope of the present invention is not limited in this regard.

As described above, in some implementations combining AI and physics simulations may be done during design phases of a game. More specifically, after initial programming is done and a prototype program is available for execution, during such prototype or validation execution the AI subsystem may seek one or more speculative physics simulations to determine potential results of possible actions. These speculative physics simulation results may then be analyzed by the game designer. Based on the results, the game designer may select one or more potential actions for incorporation into a graph of potential actions. Thus based on this speculative operation, one or more additional potential actions may be added to a preprogrammed set of actions available to an AI character as a revision or update to the prototype program. Thus with reference back to FIG. 1B, the additional node 40 may be added to a preprogrammed graph such as graph 10 of FIG. 1A, based on a speculative physics simulation performed during a prototype operation of the game.

Thus using various embodiments of the present invention, during game operation an AI character may select from multiple potential actions based on pre-programmed decisions described by a designer and incorporated into the game. Still further, additional potential actions may be based on potential decisions generated by the AI subsystem during game development. During such prototype game operation, upon receiving results including potential decisions, the AI subsystem may update a graph of potential actions that already includes one or more potential actions that have been pre-programmed by the game designer. In this prototype operation mode, in one implementation the prototype game may be controlled to store any added potential decisions to the graph in a trace cache or other storage location such that it may be later accessed by the game designer. Still further, in some implementations prototype game operation may be controlled such that one or more of these dynamically updated potential actions may be selected for execution by the AI character, even if its cost is greater than that of the statically-defined actions. The results of such execution may also be stored in the trace cache or other such storage so that the game designer can, upon review of game operation, determine whether such actions may be desirable for pre-programming into the graph of potential actions. Thus based on this operation, during game development it is possible that these potential decisions may then be selected by the designer for incorporation such that they do become pre-programmed into a final version of the game.

Finally, in various embodiments, during run time operation the AI subsystem can request of the physics subsystem one or more speculative physics simulations automatically during run time. Results associated with these potential actions can be added to a graph of potential actions to be performed. Thus during run time, the AI character can then select one of these dynamically added actions, enhancing the reality of the game to the user.

Figure 4:
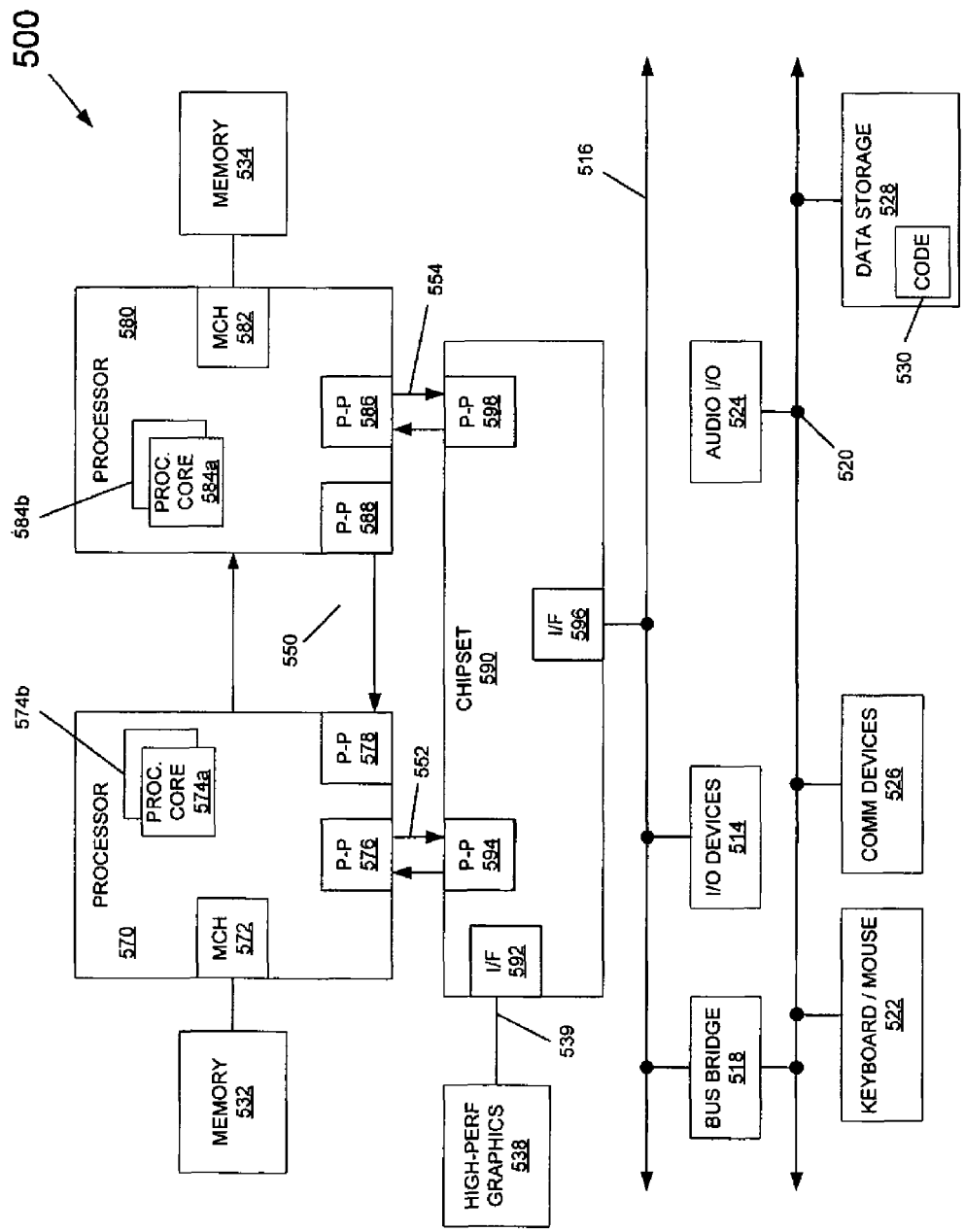
FIG. 4 is a block diagram of a system in accordance with an embodiment of the present invention.

Embodiments may be implemented in many different system types. Referring now to FIG. 4, shown is a block diagram of a system in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b), although potentially many more cores may be present in the processors. Each processor core may be an in-order processor having a wide vector processing unit with coherent and cache memories coupled thereto by an interprocessor communication network (not shown in FIG. 4). Still further, in some embodiments processors 570 and 580 may further include fixed function co-processors which, in one embodiment may include one or more dedicated physics processing units, which may be adapted to perform speculative physics simulations. However, in many implementations speculative physics simulations perform in accordance with an embodiment of the present invention may be executed on a selected one or more (e.g., a subset) of the processor cores. Thus embodiments may take advantage of an architecture having a many-core environment to perform high speed speculative physics simulations for use in connection with an AI character controlled by an AI subsystem executing on one more of the processor cores.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 2, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 4, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 4, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
identifying, by a processor, a deformable object of an environment of a video game that is visible by an artificial intelligence (AI) character of the video game;
requesting, by the processor, at least one speculative physics simulation each for a speculative action to be performed on the deformable object; and
selecting, by the processor, one of a plurality of actions that can be taken by the AI character, wherein the selection is based at least in part on the at least one speculative physics simulation.

2. The method of claim 1, further comprising selecting the action from the plurality of actions based at least in part on a cost associated with each action.

3. The method of claim 1, further comprising requesting a plurality of speculative physics simulations, wherein a priority of the speculative physics simulations is based on a distance between the corresponding deformable object and the AI character.

4. The method of claim 1, further comprising performing the at least one speculative physics simulation using a simulation model having a first accuracy, the first accuracy having a lower accuracy than a simulation model having a second accuracy performed for actual movement of the deformable object.

5. The method of claim 1, further comprising receiving a result associated with one of the speculative actions and updating a graph of potential actions to be taken by the AI character based on the result.

6. The method of claim 5, wherein the graph of potential actions prior to the updating includes only pre-programmed actions.

7. The method of claim 1, further comprising evaluating multiple deformable object manipulation options in an AI subsystem that controls the AI character based on the at least one speculative physics simulation.

8. The method of claim 7, further comprising evaluating each of the multiple deformable object manipulation options on a different core or subset of cores of a multi-core processor.

9. The method of claim 1, further comprising limiting available processor resources to perform the at least one speculative physics simulation to a predetermined level.

10. An article comprising a non-transitory storage medium including instructions that when executed cause a system to:
identify a deformable object of an environment of a video game that is visible by an artificial intelligence (AI) character, during developmental execution of a prototype version of the video game;
perform at least one speculative physics simulation associated with the deformable object to generate a physics model including an integration stage and a collision detection stage to determine a result associated with a possible action to the deformable object by the AI character;
incorporate the result into a graph of possible actions to be taken by the AI character, wherein the graph includes a plurality of pre-programmed actions; and
store the result in a temporary storage for access by a programmer of the video game.

11. The article of claim 10, further comprising instructions to select one of a plurality of actions that can be taken by the AI character from the graph of possible actions.

12. The article of claim 11, further comprising instructions to cause the AI character to select from the graph a dynamically defined action corresponding to the result for execution, wherein a cost associated with the dynamically defined action is greater than a cost associated with the pre-programmed actions.

13. The article of claim 12, further comprising instructions to store a result occurring due to the selected action in the temporary storage for access by the programmer.

14. A system comprising:
a processor including a plurality of cores to independently execute instructions; and
a dynamic random access memory (DRAM) to store a program including instructions, the program having an artificial intelligence (AI) module and a physics module to execute on the processor, the AI module to identify a deformable object of an environment of the program that is visible by an AI character controlled by the AI module, request the physics module to perform a speculative physics simulation for a speculative action to be performed on the deformable object to determine a result, the speculative physics simulation limited to a predetermined level of bandwidth of the processor, and add the action to a set of actions that the AI character can take on the deformable object, wherein others of the set of actions are pre-programmed.

15. The system of claim 14, wherein the AI module is to add the action to a graph of potential actions, and associate a cost with the action.

16. The system of claim 15, wherein the instructions enable the AI module to select an action from the set of actions, wherein the selection is based at least in part on a cost for the selected action.

17. The system of claim 16, wherein the physics module is to perform the speculative physics simulation at a lower accuracy than a physics simulation to be performed if the action is selected.

18. The system of claim 14, wherein the AI module is to request a plurality of speculative physics simulations, and the physics module is to prioritize the speculative physics simulations based on a distance between the corresponding deformable object and the AI character.

19. The system of claim 18, wherein the physics module is to execute each of the plurality of speculative physics simulations on a different one of the plurality of cores.

20. The system of claim 14, wherein at least one of the pre-programmed actions is derived from a request of the AI module for a speculative physics simulation during prototype execution of the program.

* * * * *